United States Patent [19]

Imura et al.

[11] Patent Number: 4,651,470
[45] Date of Patent: Mar. 24, 1987

[54] VEHICLE DOOR STRUCTURE HAVING PLASTIC DOOR PANEL

[75] Inventors: Yutaka Imura; Takesi Konisi; Takanori Tuchiya; Morio Umeda; Hisao Fukutomi; Koji Kuraoka, all of Hiroshima, Japan

[73] Assignee: Mazda Motor Corporation, Hiroshima, Japan

[21] Appl. No.: 877,747

[22] Filed: Jun. 24, 1986

[30] Foreign Application Priority Data

Jun. 25, 1985 [JP] Japan .................. 60-140032
Jun. 25, 1985 [JP] Japan .................. 60-140033
Jun. 25, 1985 [JP] Japan .................. 60-97348[U]
Apr. 30, 1986 [JP] Japan .................. 61-101300

[51] Int. Cl.[4] ............................................. B60J 5/04
[52] U.S. Cl. ................................... 49/502; 296/146
[58] Field of Search .............. 49/502, 501; 296/146

[56] References Cited

U.S. PATENT DOCUMENTS 3,782,036 1/1974 Clark et al. ................... 49/502
4,306,381 12/1981 Presto ......................... 49/502
4,328,642 5/1982 Presto ......................... 49/502
4,512,240 4/1985 Mahler et al. ............... 49/503 X

FOREIGN PATENT DOCUMENTS 59-64316 4/1984 Japan .

Primary Examiner—Kenneth Downey
Attorney, Agent, or Firm—Fleit, Jacobson, Cohn & Price

[57] ABSTRACT

A vehicle door structure including a door panel assembly made of an outer panel of a plastic material and an inner panel of a plastic material which are connected together at front, rear and lower edge portions. A reinforcement frame is provided in the door panel assembly and includes a front member extending substantially along the front edge portion of the door panel assembly, a rear member extending substantially along the rear edge portion of the door panel assembly and a longitudinal member extending between the front and rear members. The longitudinal member is connected with the front member through a gusset plate rigidly so that a sideward rigidity of the door structure can be ensured.

18 Claims, 18 Drawing Figures

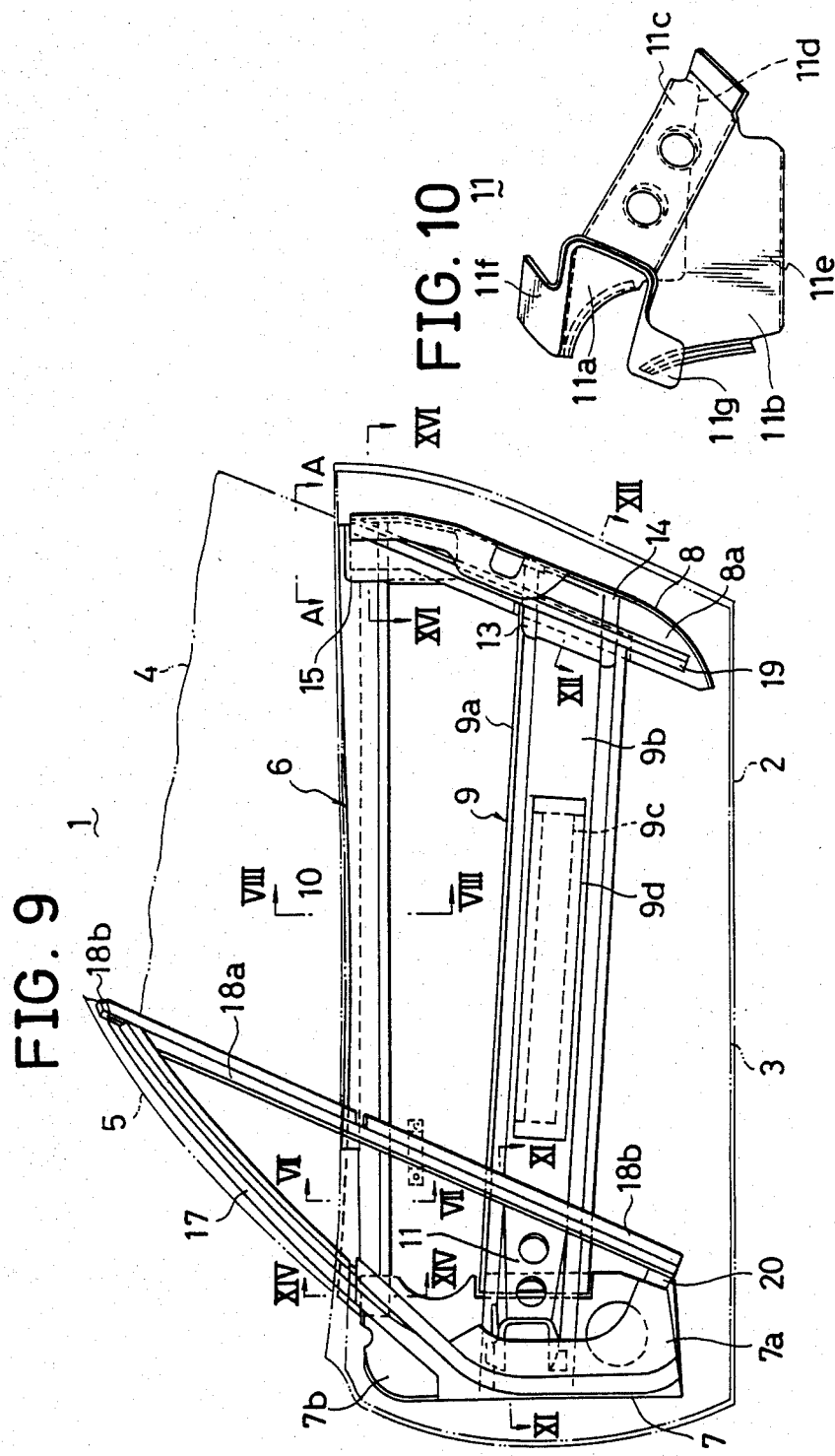

VEHICLE DOOR STRUCTURE HAVING PLASTIC DOOR PANEL

BACKGROUND OF THE INVENTION

The present invention relates to vehicle door structures, and more particularly to vehicle door structures having outer and inner door panels made of plastic materials.

DESCRIPTION OF THE PRIOR ART

In the field of vehicle door structures, it has already been proposed to provide door panels by plastic materials for the purpose of decreasing the weight of the structure. For example, Japanese patent application No. 58-97032 filed on June 2, 1983 and disclosed for public inspection on Mar. 6, 1984 under the disclosure No. 59-40939 discloses a door structure including a door inner panel made of a plastic material and connected with a door outer panel which is also made of a plastic material. In order to provide the door with a sufficient strength and rigidity, there is a reinforcement frame between the inner and outer panels. The reinforcement frame is comprised of a front member extending substantially along the front edge portion of the door structure, a rear member extending substantially along the rear edge portion of the door structure and a longitudinal member extending between the front and rear members. The front and rear members are respectively of channel shaped cross-sectional configurations and the longitudinal member is connected at the front and rear ends with the flanges of the front and rear members. The door structure as disclosed by the Japanese patent application is of a type having a fixed window glass so that the longitudinal member can be of a width equivalent to the space between the door inner and outer panels. Thus, the reinforcement frame can provide a satisfactorily high strength and rigidity.

It should however be noted that the fixed window glass very often causes inconveniencies and it often becomes desirable to make the window glass vertically movable so that the door window can be opened. However, in order to make the window glass vertically movable, it becomes necessary to decrease the width of the longitudinal member of the reinforcement frame to thereby provide a space wherein the window glass is moved. This will cause a decrease in the thicknesswise rigidity of the door structure and further weakens the connection bettween the longitudinal member and the front and rear members.

SUMMARY OF THE INVENTION

It is therefore an object of the present invention to provide a vehicle door structure having plastic door panels and a vertically movable window glass but possesing a satisfactory strength and rigidity.

Another object of the present invention is to provide a vehicle door structure having plastic inner and outer door panels and metallic reinforcement frame means which can reinforce the door panels without disturbing the vertical movement of the window glass.

A further object of the present invention is to provide a vehicle door structure having plastic door panels and metallic reinforcement frame which can provide the door structure with sideward strength and rigidity simultaneously functioning as a longitudinal impact bar.

According to the present invention, the above and other object can be accomplished by a vehicle door structure including an inner door panel made of a plastic material, an outer door panel made of a plastic material and connected at peripheral portions with said inner door panel to form a door panel structure having front, rear and lower edge portions wherein said inner and outer door panels are connected together, reinforcement frame means provided in said door panel structure and including a front member extending substantially along said front edge portion of said door panel structure and a rear member extending substantially along said rear edge portion of said door panel structure and connected with said front member through a longitudinally extending member, characterized by the fact said front member of the reinforcement frame means is of a substantially U-shaped cross-section having an outer and inner flanges and a front wall between said outer and inner flanges, said longitudinally extending member having a front end portion connected with said front member at a portion other than the inner flange, connecting gusset means being provided for connecting said front end portion of the longitudinally extending member with said inner flange of said front member of the reinforcement frame means.

According to the features of the present invention, it is possible to decrease the thickness of the longitudinally extending member without sacrificing the widthwise rigidity of the door panel because the longitudinally extending member is connected at the front end with the inner flange of the front member as well as the other portion of the front member. It is therefore possible to provide a vertically movable window glass without being disturbed by the longitudinally movable member of the reinforcement frame means.

According to a preferable mode of the present invention, the longitudinally extending member is located to extend substantially along the outer panel of the door panel structure and a space is provided between the longitudinally extending member and the inner panel of the door panel structure for passing the window glass. The door panel structure may have an upper edge portion which defines the belt line of the vehicle body and a second longitudinal member may be provided substantially along the upper edge portion of the door panel structure to further strengthen the door assembly.

The above and other objects and features of the present invention will become apparent from the following descriptions of a preferred embodiment taking reference to the accompanying drawings.

BRIEF DESCRIPTION OF THE DRAWINGS

FIG. 9 is a view of the side door assembly showing the reinforcement frame structure;

FIG. 10 is a perspective view of a gusset for connecting the main longitudinal member of the reinforcement frame structure to the front member;

DESCRIPTION OF THE PREFERRED EMBODIMENT

Figure 1:
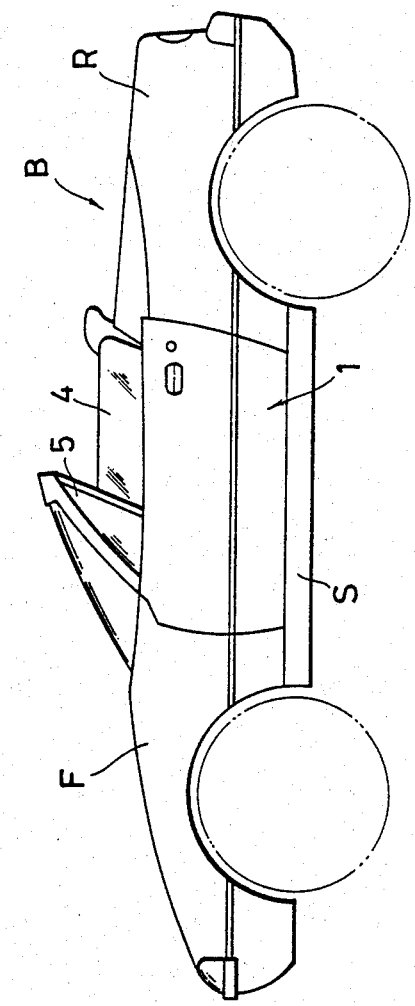
FIG. 1 is a side view of a motor vehicle having a side door assembly in accordance with one embodiment of the present invention.

Referring now to the drawings, particularly to FIG. 1, there is shown an open top motor vehicle having a body B which includes a front body section F and a rear body section R. Between the front body section F and the rear body section R, there is a floor which has a side sill S extending at each side thereof between the front body section F and the rear body section R. A side door assembly 1 is provided at each side of the vehicle body B.

Figure 2:
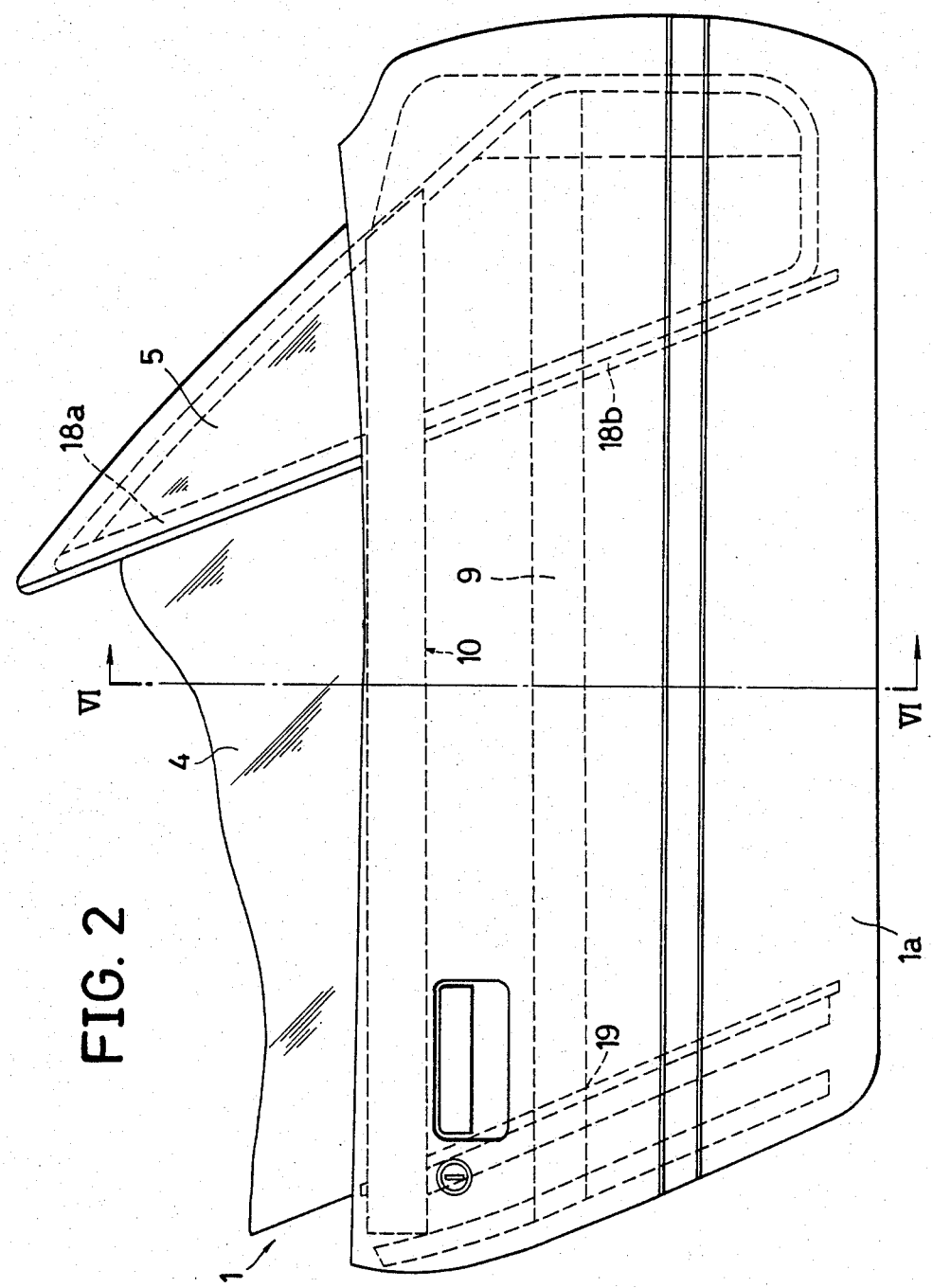
FIG. 2 is a side view of the door assembly.
Figure 3:
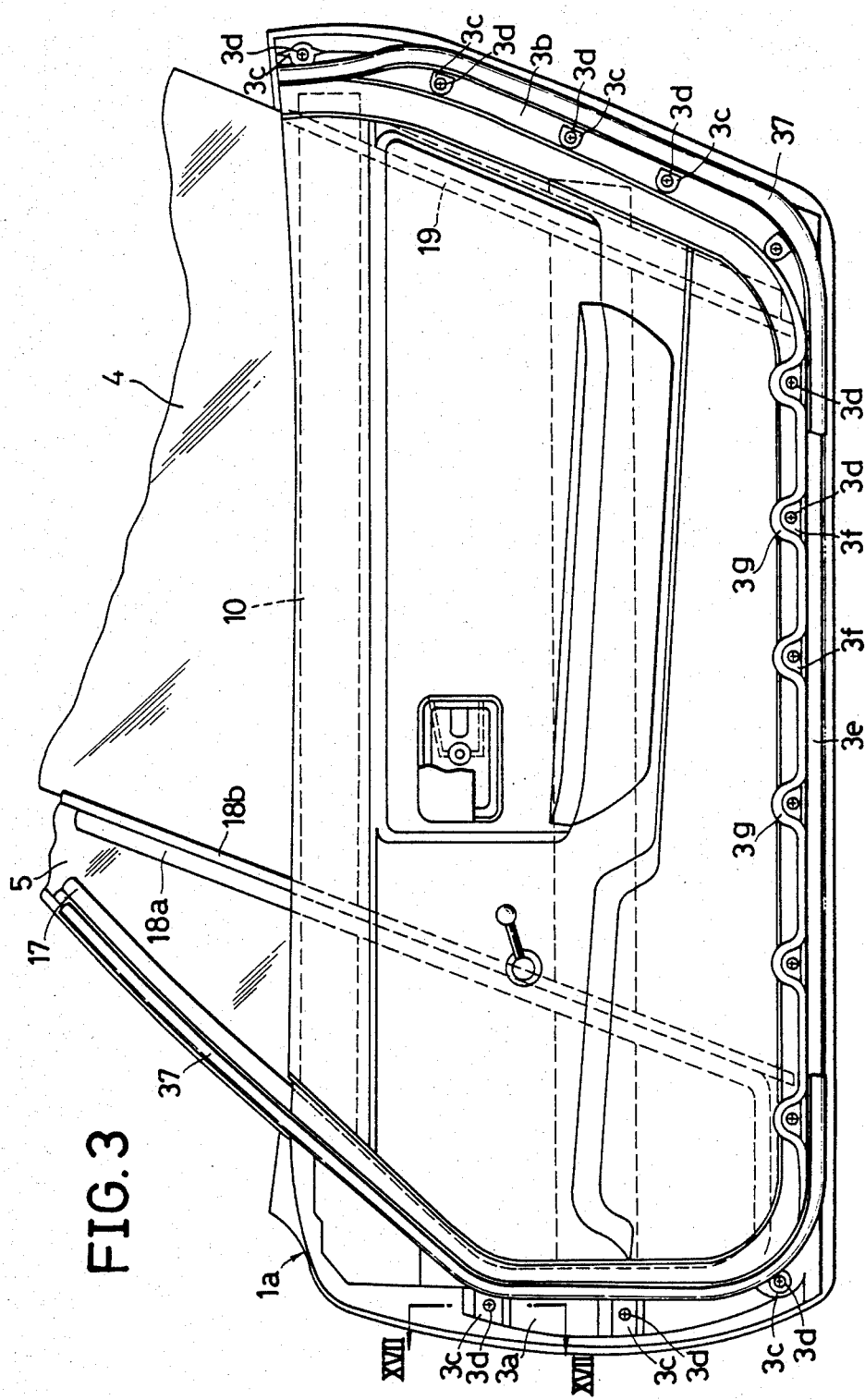
FIG. 3 is a side view of the door assembly shown in FIG. 2 as seen in the inner side of the door.
Figure 4:
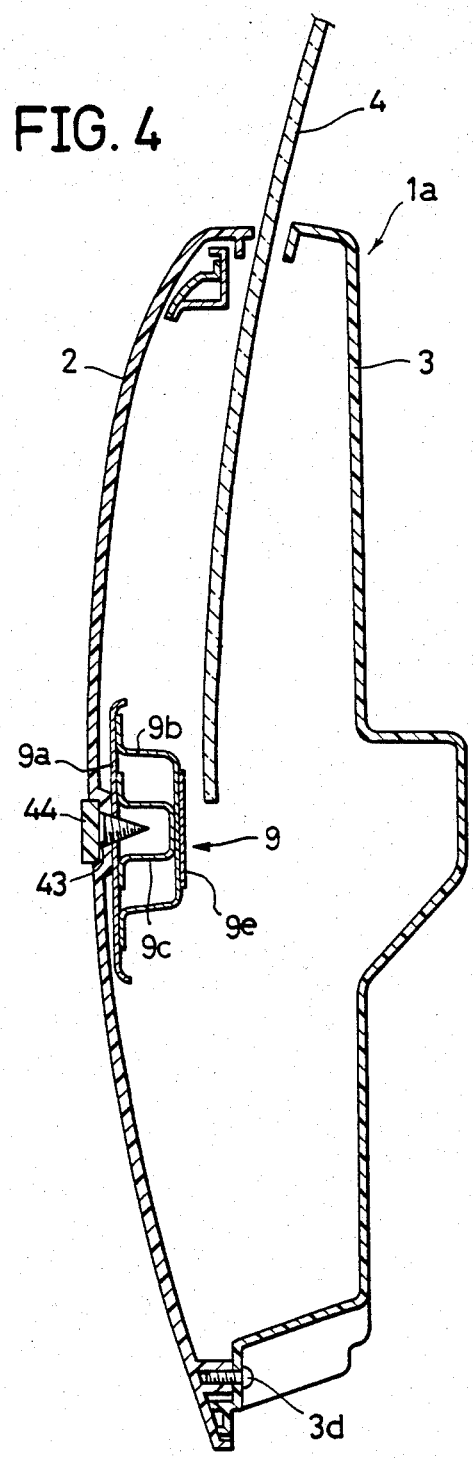
FIG. 4 is a vertical sectional view of the side door taken substantially along the line IV—IV in FIG. 2.
Figure 17:
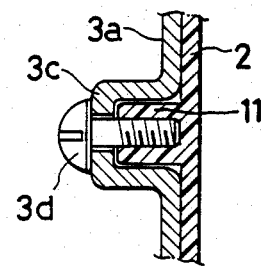
FIG. 17 is a sectional view taken along the line XVII—XVII in FIG. 3.
Figure 18:
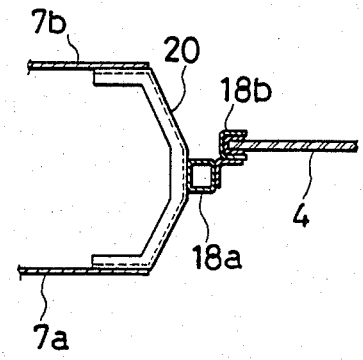
FIG. 18 is a sectional view taken along the line XVIII—XVIII in FIG. 9.

Referring to FIG. 2 which shows the side door assembly 1, it will be noted that the door assembly 1 includes a door panel structure 1a, a vertically movable window glass 4 and a triangular fixed glass 5. As shown in FIG. 4, the door panel structure 1a comprises an outer panel 2 and an inner panel 3 which are made of a plastic material and connected together at peripheral portions. Referring specifically to FIG. 3, the inner panel 3 is formed at the front and rear edge portions with flanges 3a and 3b, respectively, which are laid over the front and rear edge portions of the outer panel 2. The flanges 3a and 3b are formed with bolt seats 3c at spaced apart portions by providing an inwardly projecting portions as shown in FIG. 17. The outer panel 2 formed with bosses 11 which are adapted to be fitted to the inwardly projecting portions in the inner panel 3. The bolt seats 3c in the inner panel 3 are formed with bolt holes and the bosses 11 in the outer panel 2 are formed with threaded bolt holes, and connecting bolts 3d are inserted through the bolt holes in the inner panel 3 into the bolt holes in the outer panel 2.

Figure 5:
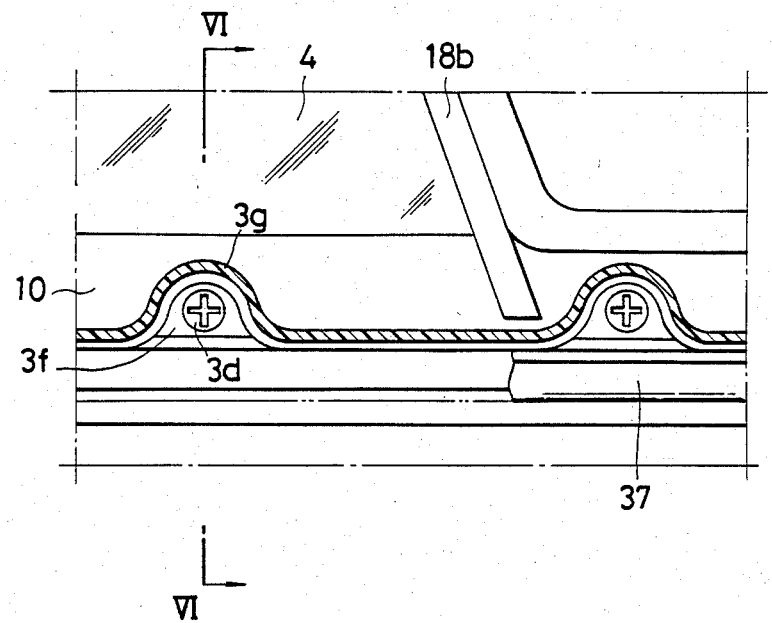
FIG. 5 is a fragmentary view showing the connection between the inner and outer panels of the door assembly at the lower edge portion.
Figure 6:
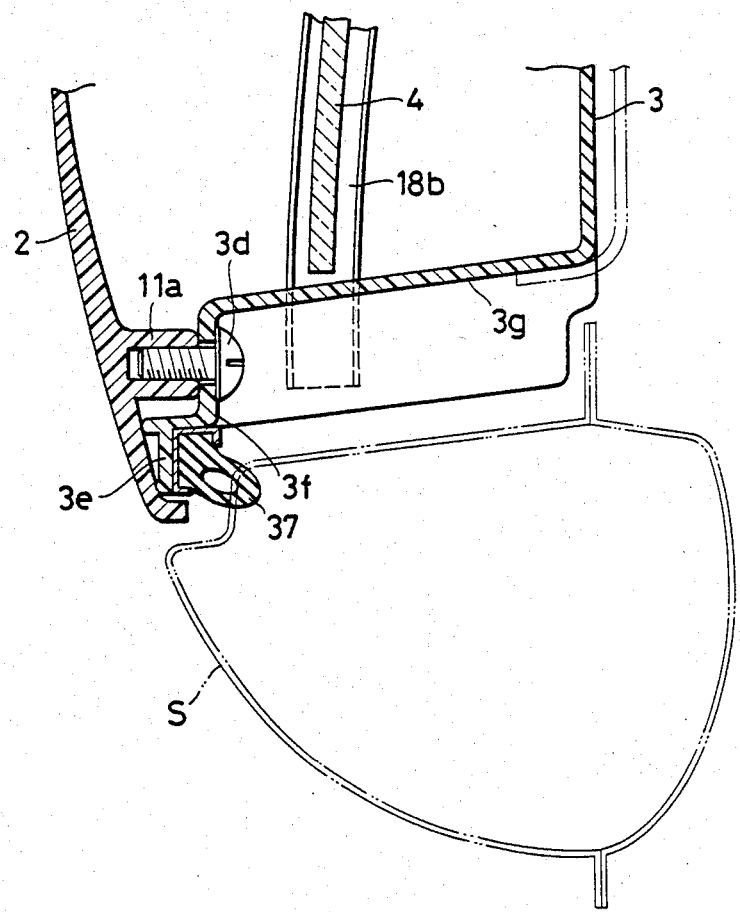
FIG. 6 is a sectional view taken substantially along the line VI—VI in FIG. 5.

At the lower edge portion, the inner panel 3 is also formed with a flange 3e which is laid over the lower edge portion of the outer panel 2. Bolt seats 3f are provided by forming semi-circular recesses 3g at peripherally spaced apart portions above the flange 3e as shown in FIG. 5. As shown in FIG. 6, the outer panel 2 is formed with bosses 11a at portions corresponding to the bolt seats 3f on the inner panel 3. Connecting bolts 3d are inserted through the bolt seats 3f and the bosses 11a. A weather strip 37 is attached to the periphery of the inner panel 3.

Referring now to FIG. 9 which shows the right side door assembly, there is provided a reinforcement frame 6 in the door panel structure 1a. The reinforcement frame 6 includes a front member 7 which extends substantially vertically along the front edge portion of the door panel structure 1a, a rear member 8 which extends substantially along the rear edge portion of the door panel structure 1a, a main longitudinal member 9 provided at a vertically intermediate portion of the door panel assembly 1a to extend between the front and rear members 7 and 8, and an auxiliary longitudinal member 10 extending between the front and rear members 7 and 8 substantially along the upper edge portion of the door panel assembly 1a which defines the belt line of the vehicle body B.

Figure 11:
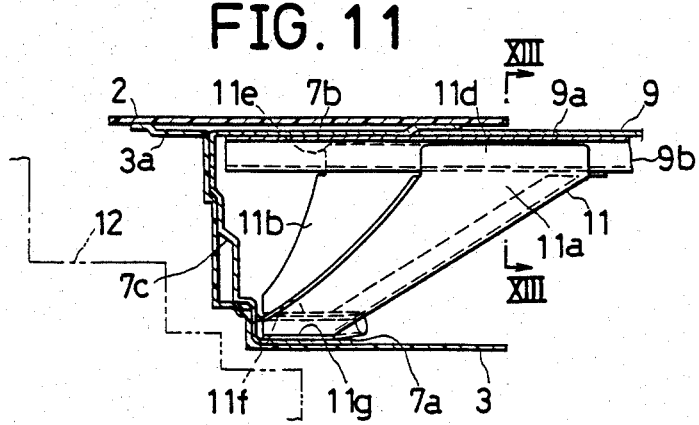
FIG. 11 is a sectional view taken along the line XI—XI in FIG. 9.

As shown in FIG. 11, the front member 7 is of a substantially U-shaped horizontal cross-section having an inner flange 7a, an outer flange 7b and a front wall 7c. In FIG. 4, it will be noted that the main longitudinal member 9 includes an outer plate 9a of a substantially planar cross-sectional configuration and a hat-shaped inner plate 9b which is welded to the outer plate 9a at the upper and lower flanges to form a structure of a closed cross-section. Between the ouer panel 9a and the inner panel 9b, there is an inner reinforcement 9c which is also of a hat-shaped cross-section and welded at the upper and lower flanges to the outer plate 9a and at the middle portion to the inner plate 9b. As shown in FIG. 4, the main longitudinal member 9 is disposed with the outer plate 9a located substantially along the inner surface of the outer panel 2. The outer plate 9a is connected to the outer panel 2 by means of screws 43 which are covered by a trim strip 44.

Figure 13:
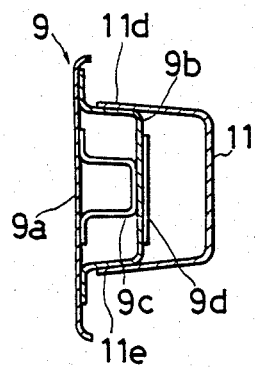
FIG. 13 is a sectional view taken along the line XIII—XIII in FIG. 11.

Referring now to FIG. 11, it will be noted that the front end portion of the outer plate 9a of the longitudinal member 9 is welded to the outer flange 7b of the front member 7. The inner plate 9b extends forward further beyond the front end of the outer plate 9a and welded to the outer flange 7b of the front member 7. In FIGS. 4 and 11, it will be noted that the main longitudinal member 9 has a thickness which is small in relation to the thickness of the door panel structure 1a so that there is provided a space between the member 9 and the inner plate 3 for accommodating the window glass 4 as described later in more detail. As shown in FIG. 11, the longitudinal member 9 is connected at the front end portion to the inner flange 7a of the front member 7 through a gusset 11 which is shown in detail in FIG. 10. As shown in FIG. 10, the gusset 11 includes an upper panel 11a of a substantially trapezoidal configuration, a lower panel 11b of a substantially trapezoidal configuration and a back panel 11c between the upper panel 11a and the lower panel 11b. The upper panel 11a has one end portion 11d which is adapted to be laid over and welded to the upper wall of the inner plate 9b of the main longitudinal member 9 as shown in FIG. 13. The lower panel 11b has one end portion 11e which is adapted to be laid over and welded to the lower wall of the inner plate 9b. The back panel 11c is formed at an end adjacent to the end portions 11d and 11e with a connecting flange which is welded to the laterally inward wall of the inner plate 9b of the main longitudinal member 9. At the other end portions, the upper panel 11a and lower panel 11b are formed with connecting flanges 11f and 11g, respectively, which are welded to the inner flange 7a of the front member 7. It will therefore be understood that the main member 9 is rigidly connected with the front member 7 even though the main member 9 is small in thickness as previously described.

Figure 12:
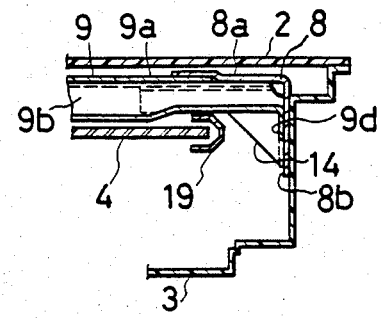
FIG. 12 is a sectional view taken along the line XII—XII in FIG. 9.

Referring to FIG. 12, the rear member 8 is of an L-shaped cross-section having legs 8a and 8b at the level of the main member 9. The outer plate 9a of the main member 9 is welded to the leg 8a of the rear member 8. The inner plate 9b is formed at the rear end with a connecting flange 9d which is welded to the leg 8b of the rear member 8. Gussets 13 and 14 are provided to further connect the rear end portion of the inner plate 9b to the leg 8b of the rear member 8. It will therefore be understood that the main longitudinal member 9 is connected both at the front and rear ends rigidly to the front and rear members 7 and 8 so that the sideward rigidity of the door assembly 1 can be increased even though the main longitudinal member 9 is of a relatively small thickness. It will further be understood that the main member 9 can function as an impact bar which transmit the front shock loads from the front fender F to the rear fender R in case of a front crash to thereby prevent the passenger's compartment from being collapsed. As shown in FIGS. 4 and 9, a reinforcing plate 9e may be attached to the inner plate 9b at the intermediate portion thereof.

Figure 7:
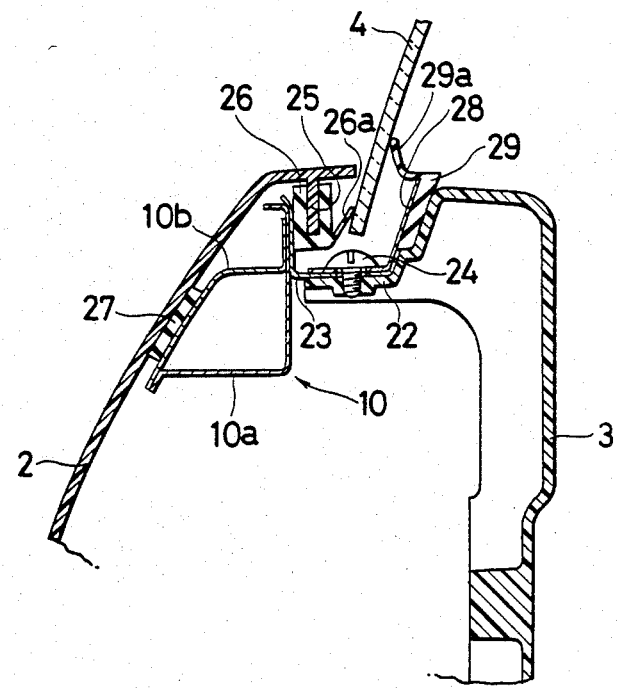
FIG. 7 is a sectional view taken along the line VII—VII in FIG. 9.
Figure 8:
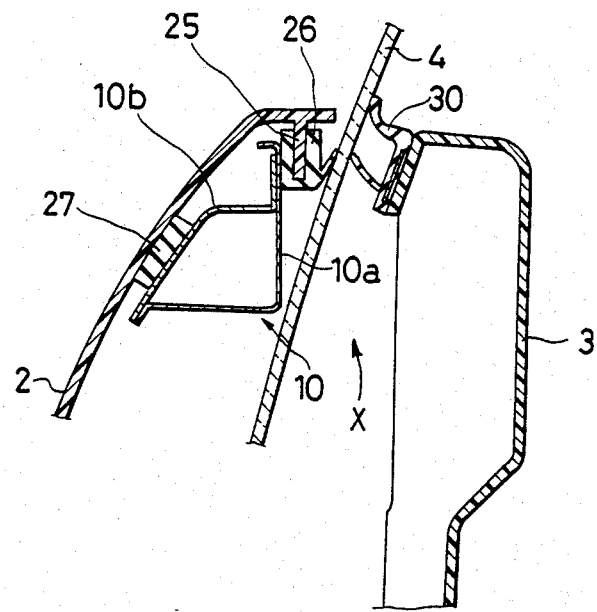
FIG. 8 is a sectional view taken along a line VIII—VIII in FIG. 9.
Figure 14:
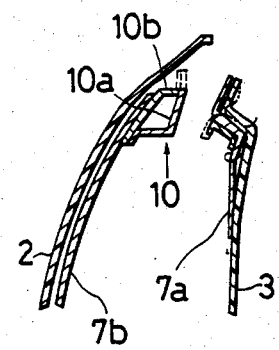
FIG. 14 is a sectional view taken along the line XIV—XIV in FIG. 9.
Figure 15:
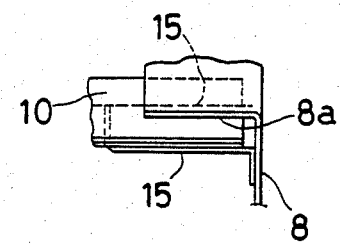
FIG. 15 is a view as seen in the direction of the arrow A—A in FIG. 9.
Figure 16:
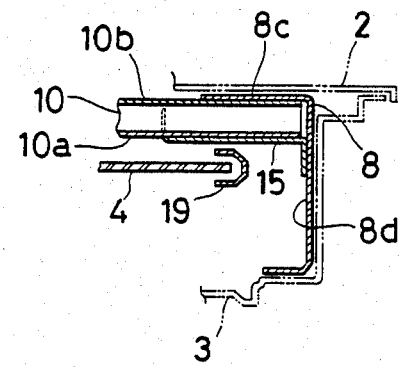
FIG. 16 is a sectional view taken along the line XVI—XVI in FIG. 9.

As shown in FIGS. 7 and 8, the auxiliary longitudinal member 10 includes an inner plate 10a and an outer plate 10b which are welded together to form a structure of a closed cross-section. At the front end, the member 10 is welded to the outer flange 7b of the front member as shown in FIG. 14. The connection between the rear end portion of the member 10 and the rear member 8 is shown in FIGS. 15 and 16. As shown in FIG. 16, the rear member 8 is of a substantially U-shaped cross-section having an outer flange 8c which is continuous with the leg 8a and a web portion 8d which is continuous with the leg 8b at the upper end portion, and the outer plate 10b of the member 10 is welded to the outer flange 8c. The inner plate 10a of the member 10 is connected to the web 8d by means of a connecting member 15.

In FIG. 9, it will be noted that a rearwardly inclined front window sash 17 is provided and supported at the lower end by the front member 7. A rear window sash 18a is connected at the upper end to the upper end of the front sash 17 and extends downwards into the door panel structure 1a. The rear sash 18a is connected at the lower end with the flanges 7a and 7b in the lower end portion of the front member 7 through a bracket 20. The triangular fixed glass 5 is attached to the window sashes 17 and 18a by means of an adhesive. The lower end of the glass 5 is inserted between the outer panel 2 and the inner panel 3 as shown in FIG. 7. Beneath the lower edge of the glass 5, the inner panel 3 is formed with an outwardly bent flange portion 22 which carries a substantially L-shaped plate 23 secured to the flange portion 22 by means of bolts 24. The plate 23 is welded to the longitudinal member 10 so that the longitudinal member is carried by the inner panel at the front end. The upper edge portion of the outer panel 2 is formed at the front end portion with a downwardly extending leg 25 which carries a weather strip 26. The upper end portion of the longitudinal member 10 is held in tight engagement with the weather strip 26. Further, a resilient member 27 is provided between the outer panel 2 and the outer plate 10b of the longitudinal member 10. The bolts 24 further connects a bracket 28 carrying a weather strip 29. The weather strip 29 has a sealing lip 29a which is engaged with the lower edge portion of the glass 5. The weather strip 26 has a sealing lip 26a which is engaged with the lower edge portion of the glass 5.

In FIG. 9, it will be noted that the window sash 18a supports a front window rail 18b. A rear window rail 19 is provided substantially along the rear member 8 and connected with the rear member 8. The window glass 4 is mounted to slidably move along the window rails 18b and 19. A window glass driving mechanism of a known type is provided for driving the window glass 4 along the window rails 18a and 19. As shown in FIG. 8, the weather strip 26 supported by the leg 25 is extended rearwards and engaged with the window glass 4. A weather strip 30 is further carried by the upper edge portion of the inner panel 3 so as to engage the window glass 4.

The invention has thus been shown and described with reference to a specific embodiment, however, it should be noted that the invention is in no way limited to the details of the illustrated structures but changes and modifications may be made without departing from the scope of the appended claims.

We claim:

1. A vehicle door structure including an inner door panel made of a plastic material, an outer door panel made of a plastic material and connected at peripheral portions with said inner door panel to form a door panel structure having front, rear and lower edge portions wherein said inner and outer door panels are connected together, reinforcement frame means provided in said door panel structure and including a front member extending substantially along said front edge portion of said door panel structure and a rear member extending substantially along said rear edge portion of said door panel structure and connected with said front member through a longitudinally extending member, characterized by the fact said front member of the reinforcement frame means is of a substantially U-shaped cross-section having an outer and inner flanges and a front wall between said outer and inner flanges, said longitudinally extending member having a front end portion connected with said front member at a portion other than the inner flange, connecting gusset means being provided for connecting said front end portion of the longitudinally extending member with said inner flange of said front member of the reinforcement frame means.

2. A vehicle door structure in accordance with claim 1 in which said longitudinally extending member includes an outer plate and a substantially hat-shaped inner plate which are connected together to form a structure of a closed cross-section.

3. A vehicle door structure in accordance with claim 2 in which a reinforcement plate is provided between the outer and inner plate at a longitudinally intermediate portion of the longitudinally extending member.

4. A verhicle door structure in accordance with claim 3 in which a second reinforcement plate is attached to the inner plate at a longitudinally intermediate portion of the inner plate.

5. A vehicle door structure in accordance with claim 1 in which said rear member includes an outer flange and a rear wall, said longitudinally extending member having a rear end portion connected to said ouuter flange and said rear wall of the rear member.

6. A vehicle door structure in accordance with claim 5 in which gusset plate means is provided to further connect the longitudinally extending member to said rear wall of the rear member.

7. A vehicle door structure in accordance with claim 1 in which said connecting gusset means is of a substantially U-shaped cross-section having an upper panel, a lower panel and a back panel between said upper and lower panels.

8. A vehicle door structure in accordance with claim 7 in which said upper and lower panels are connected at one end portions with appropriately formed upper and lower surfaces of the longitudinally extending member.

9. A vehicle door structure in accordance with claim 7 in which said upper and lower panels of the gusset means are provided at ends opposite to said one end portions with connecting flanges which are connected with said inner flange of the front member.

10. A vehicle door structure in accordance with claim 1 in which a second longitudinal member is provided to extend between the front and rear members substantially along an upper edge portion of the door panel structure.

11. A vehicle door structure in accordance with claim 10 in which said second longitudinal member has a front end portion connected with the outer flange of the front member and a rear end portion connected with the outer flange of the rear member.

12. A vehicle door structure in accordance with claim 11 in which a connecting plate is provided for connecting the rear end portion of the second longitudinal member to said rear wall of the rear member.

13. A vehicle door structure in accordance with claim 10 in which said second longitudinal member is engaged with an upper edge portion of the outer panel through resilient means.

14. A vehicle door structure in accordance with claim 13 in which said resilient means includes a sealing strip of a substantially U-shaped cross-section mounted on a downward projection formed on the upper edge portion of the outer panel.

15. A vehicle door structure in accordance with claim 13 in which said second longitudinal member is connected with an upper edge portion of said inner door panel at a front end portion.

16. A vehicle door structure in accordance with claim 1 in which said inner door panel of the door panel structure is formed at front, rear and lower peripheral portions with peripheral flanges which are laid over corresponding peripheral portions of the outer door panel of the door panel structure, bolt seat means provided in said peripheral portions of the inner door panel of the door panel structure at peripherally spaced apart portions, said outer door panel of the door panel structure being formed with bosses at portions corresponding to said bolt seat means, connecting bolt means inserted through said bolt seat means into said bosses to connect the outer and inner panels of the door panel structure.

17. A vehicle door structure in accordance with claim 16 in which said bolt seat means is formed in the lower peripheral portion of the inner door panel of the door panel structure by forming semi-circular recess means in the inner door panel of the door panel structure.

18. A vehicle door structure in accrdance with claim 17 in which seal strip means is provided on an inner side along front, rear and lower peripheries of the door panel structure.

* * * * *